(12) United States Patent
Tanaka et al.

(10) Patent No.: US 7,340,053 B2
(45) Date of Patent: Mar. 4, 2008

(54) CIPHER STRENGTH ESTIMATING DEVICE

(75) Inventors: Hidema Tanaka, Koganei (JP);
Toshinobu Kaneko, Noda (JP)

(73) Assignee: National Institute of Information and Communications Technology, Tokyo (JP)

( * ) Notice: Subject to any disclaimer, the term of this patent is extended or adjusted under 35 U.S.C. 154(b) by 838 days.

(21) Appl. No.: 10/622,722

(22) Filed: Jul. 18, 2003

(65) Prior Publication Data

US 2005/0117742 A1    Jun. 2, 2005

(51) Int. Cl.
H04N 1/44      (2006.01)
H04K 1/00      (2006.01)
H04L 9/00      (2006.01)

(52) U.S. Cl. .................. 380/28; 380/243; 380/255; 380/277

(58) Field of Classification Search .............. 380/243, 380/255, 277
See application file for complete search history.

(56) References Cited

U.S. PATENT DOCUMENTS

2005/0180315 A1*    8/2005    Chitrapu et al. ............ 370/208

FOREIGN PATENT DOCUMENTS

EP            932272 A2 *    7/1999

OTHER PUBLICATIONS

Babbage & Frisch, "On MISTY1 Higher Order Differential Cryptanalysis," 3rd International Conference on Information Security and Cryptology ICISC 2000, Seoul, Korea, Dec. 8-9, 2000 (pp. 22-36).

Daemen, Knudsen & Rijmen "The Block Cipher SQUARE", 4th International Workshop FSE '97 on Fast Software Encryption, Haifa, Israel, Jan. 20-22, 1997 (Eli Biham ed.) (pp. 149-165).

Jakobsen & Knudsen "The Interpolation Attack on Block Cipher," FSE-4th International Workshop LNCS 1008.

Nyberg, Knudsen, "Provable Security Against Differential Cryptanalysis," Journal of Cryptology, vol. 8-No. 1.

Shimoyama, Moriai, Kaneko, "Improving the Higher Order Differential Attack and Cryptanalysis of the KN Cipher," 1997 1st International Workshop on Information Security Workshop LNCS 1396, Tatsunokuchi, Ishikawa, Japan, Sep. 1997 (pp. 32-42).

Tanaka, Hisamatsu, Kaneko, "Strength of MISTY1 without FL Function for Higher Order Differential Attack," 13th International (Symposium, Applied Algebra-Algebraic Algorithms and Error-Correcting Codes) 1999, LNCS 1636 (pp. 221-231).

(Continued)

Primary Examiner—Nasser Moazzami
Assistant Examiner—Chinwendu C Okoronkwo

(57) ABSTRACT

This invention intends to reduce the amount of calculation required by a cipher strength estimating device for estimating a ciphertext in collectively finding session keys for plural rounds of transformation. The cipher strength estimating device is configured to: first calculate one session key prospect presumed to be equivalent to a session key for use at a certain round of transformation in encryption which is calculated from a key; perform a decrypting operation with the session key prospect presumed to be true; calculating a session key prospect for the round immediately preceding the certain round based on the resulting text thereby calculating session keys for different rounds. This device enhances the possibility that plural true session keys are calculated faster.

4 Claims, 8 Drawing Sheets

OTHER PUBLICATIONS

L. Knudsen, "Truncated and Higher Order Differentials," *Fast Software Encryption: 2nd International Workshop*, Leuven, Belgium (Dec. 14-16, 1994), LNCS 1008, pp. 196-211, Springer-Verlag.

X. Lai, "Higher Order Derivatives and Differentia Cryptanalysis," $R^3$ Security Engineering AG Ch-8607 Aathal, Switzerland, pp. 1-7; Reprint of pp. 227-233, "Communications and Cryptography," (Ed. R Blahut et al.), Kluwer Academic Publishers (1994).

M. Matsui, "New Structure of Block Ciphers with Provable Security against Differential and Linear Cryptanalysis, *Fast Software Encryption: 3rd International Workshop*, Cambridge, UK (Feb. 21-23, 1996), LNCS. 1039, pp. 205-218.

S. Moriai, T. Shimoyama, T. Kaneko, "Higher Order Differential Attack of a CAST Cipher, *Fast Software Encryption: 4th International Workshop*, LNCS 1372, pp. 17-31.

\* cited by examiner

CIPHER STRENGTH ESTIMATING DEVICE

TECHNICAL FIELD

The present invention relates to a cipher strength estimating device.

BACKGROUND OF THE INVENTION AND RELATED ART STATEMENT

Common-key cryptography using a common key in encryption and decryption includes block ciphers based on an encryption system which divides, for example, data into blocks and encrypts the data on a block basis. Such block ciphers include those produced by stepwise encryption of a plaintext with repeated transformation using, as a parameter, a session key calculated from a common key such as DES or MISTY.

A cipher is estimated by actually making attempts to decipher the cipher in order to prove that the cipher can be utilized safely in a society. Known examples of such cryptanalysis include: the brute-force search method which is capable of finding a key by using all putative keys in conducting encryption or decryption if a pair of plaintext and ciphertext is given; the differential cryptanalysis which is adapted to find a session key to be used at the final round of transformation on condition that there is a high probability that a relationship holds between the exclusive-OR between the plaintexts of two pairs of plaintext and ciphertext and the exclusive-OR between the ciphertexts of the two pairs; and the higher order differential cryptanalysis adapted to find a session key by an algebraic method such that a ciphertext outputted at the final round of transformation is expressed using a Boolean polynomial of the corresponding plaintext and a higher order differential of this polynomial is considered to be a constant to be used as a condition for presuming the session key.

However, since any one of such methods is presently employed to find one key, these methods will not contribute to a reduction in the amount of calculation required to find session keys for plural rounds for the purpose of estimating a cipher more precisely if they are employed in each of the rounds simply.

LIST OF NON-PATENT LITERATURE DOCUMENTS (REFERENCES)

Document 1: Babbage, Frisch, "On MISTY1 Higher Order Differential Cryptanalysis", $3^{rd}$ International Conference on Information Security and Cryptology 2000

Document 2: Daemon, Knudsen, Rijmen, "The BlockCipher SQUARE", FSE-$6^{th}$ (1) International Workshop LNCS.1636

Document 3: Jakobsen, Knudsen, "The Interpolation Attack on Block Cipher", FSE-$4^{th}$ International Workshop, LNCS.1372

Document 4: Knudsen, "Trancated and Higher Order Diferentials", FSE-$2^{nd}$ International Workshop, LNCS.1008

Document 5: Lai, "Higher Order Derivatives and Differential Cryptanalysis", Communications and Cryptography Document 6: Matsui, "NewStructure of Block Ciphers with Provable Security against Differential and Linear cryptanalysis", FSE-$3^{rd}$ International Workshop, LNCS.1039

Document 7: Moriai, Shimoyama, Kaneko, "Higher Order Attack of a CAST Cipher", FES-$4^{th}$ International Workshop, LNCS.1372

Document 8: Nyberg, Knudsen, "Provable Security against Differential Cryptanalysis", Journal of Cryptology, Vol.8-no.1

Document 9: Shimoyama, Moriai, Kaneko, "Improving the Higher Order Differential Attack and Cryptanalysis of the KN Cipher", 1997 Information Security Workshop, LNCS.1396

Document 10: Tanaka, Hisamatsu, Kaneko, "Strength of MISTY1 without FL function for Higher Order Differential Attack", $13^{th}$ International Symposium, Applied Algebra-Algebraic Algorithms and Error-Correcting Codes 1999, LNCS.1719

SUMMARY OF THE INVENTION

Accordingly, it is an object of the present invention to reduce the amount of calculation and the like required to collectively find session keys for plural rounds.

That is, the present invention provides a cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption,(2)

the cipher strength estimating device comprising an untransformed text calculating unit and a control unit, the untransformed text calculating unit comprising a session key prospect calculating section and an untransformed text calculating unit body, wherein:

the untransformed text calculating unit is operative to receive, as inputs thereto, the plaintext and one of the ciphertext obtained at the final round of the transformation process and a putative transformed text presumed to be a transformed text obtained at a certain intermediate round;

the session key prospect calculating section is operative to: calculate one session key prospect presumed to be equivalent to the session key to be used at a relevant round of transformation by using the plaintext and one of the ciphertext and the putative transformed text or output uncalculability identifier data indicative of inability to calculate when the calculation is impossible; and optionally calculate another session key prospect for the relevant round which is different from the session key prospect already outputted in response to receipt of recalculation request data requesting recalculation;

the untransformed text calculating unit body is operative to: calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the untransformed text calculating unit; receive the putative untransformed text outputted; and repeatedly further input the putative untransformed text as a putative transformed text for a round immediately preceding the relevant round to the untransformed text calculating unit together with the plaintext; and optionally output the recalculation request data to the session key prospect calculating section in response to receipt of the uncalculability identifier data outputted from the session key prospect calculating section to cause the session key prospect calculating section to again calculate said another session key prospect for the immediately preceding round and then output the putative untransformed text based on said another session key prospect.

This cipher strength estimating device, which is configured to calculate plural prospects in advance and reduce the number of such prospects in the process of calculating a key for the immediately preceding round, is more effective in (3a) reducing the amount of calculation and the like than the approach to find keys for respective rounds separately. Further (3b), the feature that a session key for the immediately preceding round is found on the assumption that a certain session key prospect is the session key, is capable of finding out plural session keys at an earlier stage than by the approach to complete calculations of all session key prospects for each round (3c) before calculating the session key prospect for the immediately preceding round.

The present invention also provides, as an example having a similar effect, a cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising an untransformed text calculating unit and a control unit, the untransformed text calculating unit comprising a session key prospect calculating section and an untransformed text calculating unit body, wherein:

the untransformed text calculating unit is operative to receive, as inputs thereto, the plaintext and one of the ciphertext obtained at the final round of the transformation process and a putative transformed text presumed to be a transformed text obtained at a certain intermediate round;

the session key prospect calculating section is operative: to dynamically create a condition for use in calculating a session key prospect presumed to be equivalent to the session key to be used at a relevant round of transformation by using the plaintext and one of the ciphertext and the putative transformed text; and calculate one session key prospect based on the condition thus created or output uncalculability identifier data indicative of inability to calculate when the calculation is impossible; and optionally calculate another session key prospect for the relevant round which is different from the session key prospect already outputted in response to receipt of recalculation request data requesting recalculation;

the untransformed text calculating unit body is operative to: calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the untransformed text calculating unit; receive the putative untransformed text outputted; repeatedly (4a) further input (4b) the putative untransformed text as a putative transformed text for a round immediately preceding the relevant round to the untransformed text calculating unit together with (4c) the plaintext; and optionally output the recalculation request data to the session key prospect calculating section in response to receipt of the uncalculability identifier data outputted from the session key prospect calculating section (4d) to cause the session key prospect calculating section to again calculate said another session key prospect for the immediately preceding round and then output the putative untransformed text based on said another session key prospect.

In finding out a session key prospect for a round immediately preceding a certain round for one session key prospect presumed to be equivalent to a session key for the certain round, the device thus configured is capable of creating a condition for calculating an optimum session key prospect for the preceding round based on the session key prospect for the certain round and the like and hence can reduce the amount of calculation and the like.

The cipher strength estimating device may be a cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising an untransformed text calculating unit and a control unit, the untransformed text calculating unit comprising a session key prospect calculating section and an untransformed text calculating unit body, wherein:

the untransformed text calculating unit is operative to receive, as inputs thereto, the plaintext and one of the ciphertext obtained at the final round of the transformation process and a putative transformed text presumed to be a transformed text obtained at a certain intermediate round;

the session key prospect calculating section is operative to: dynamically create conditions for use in calculating a session key prospect presumed to be equivalent to the session key to be used at a relevant round of transformation by using the plaintext and one of the ciphertext and the putative transformed text; calculate the session key prospect based on the conditions thus created or identify inability to calculate when inconsistency is found between certain two of the conditions and then output uncalculability identifier data indicative of inability to calculate; and optionally calculate another session key prospect for the relevant round which is different from the session key prospect already outputted in response to receipt of recalculation request data requesting recalculation;

the untransformed text calculating unit body is operative to calculate the putative untransformed text presumed to be equivalent to an untransformed text which is not transformed yet at the relevant round based on the session key prospect and one of the ciphertext and the putative transformed text; and output the putative untransformed text as an output of the untransformed text calculating unit (5); and the control unit is operative to: input the plaintext and one of the ciphertext obtained at the final round of the transformation process and the putative transformed text obtained at the certain intermediate round, which make a pair, to the untransformed text calculating unit; receive the putative untransformed text outputted; repeatedly further input the putative untransformed text as a putative transformed text for a round immediately preceding the relevant round to the untransformed text calculating unit together with the plaintext; and optionally output the recalculation request data to the session key prospect calculating section in response to receipt of the uncalculability identifier data outputted from the session key prospect calculating section to cause the session key prospect calculating section to again calculate said another session key prospect for the immediately preceding round and then output the putative untransformed text based on said another session key prospect.

The device thus configured is capable of judging a session key prospect for a certain round to be false without the need to actually calculate a session key for the immediately preceding round by adding, for example, a redundant condition or the like to the condition for use in the calculation of the session key prospect for the certain round to create plural conditions and judging whether these conditions have an inconsistency therebetween such that, for example, there is not a single session key that satisfies the conditions.

The cipher strength estimating device may have a configuration for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising a first untransformed text calculating unit, a second untransformed text calculating unit, and a control unit, the first untransformed text calculating unit comprising an untransformed text calculating unit body and a first session key prospect calculating section, the second untransformed text calculating unit comprising a second session key prospect calculating section, wherein:

the first untransformed text calculating unit is operative to receive, as inputs thereto, the plaintext and one of the ciphertext obtained at the final round of the transformation process and a putative transformed text presumed to be a transformed text obtained at a certain intermediate round;

the second untransformed text calculating unit is operative to receive, as inputs thereto (6a), the plaintext and one of the ciphertext obtained at the final round of the transformation process and a putative transformed text (6b) presumed to be a transformed text obtained at a certain intermediate round;

the first session key prospect calculating section is operative to: conduct brute-force search for the session key to be used at a certain round of transformation by using the plaintext and one of the ciphertext and the putative transformed text; calculate one session key prospect presumed to be equivalent to the session key to be used at said certain round of transformation or output uncalculability identifier data indicative of inability to calculate when the calculation is impossible; and optionally calculate another session key prospect for said certain round which is different from the session key prospect already outputted in response to receipt of recalculation request data requesting recalculation;

the second session key prospect calculating section is operative to: dynamically create plural conditions for use in calculating a session key prospect presumed to be equivalent to the session key to be used at a relevant round of transformation by higher order differential cryptanalysis using the plaintext and one of the ciphertext and the putative transformed text; and calculate one session key prospect based on the conditions thus created or identify inability to calculate when inconsistency is found between certain two of the conditions and then output uncalculability identifier data indicative of inability to calculate;

the untransformed text calculating unit body is operative to calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the first untransformed text calculating unit; receive the putative untransformed text outputted; input the putative untransformed text as a putative transformed text for a round immediately preceding the relevant round to the second untransformed text calculating unit together with the plaintext; and optionally output the recalculation request data to the first session key prospect calculating section in response to receipt of the uncalculability identifier data outputted from the second session key prospect calculating section to cause the first session key prospect calculating section to again calculate said another session key prospect for the immediately preceding round and then output the putative untransformed text based on said another session key prospect.

This configuration uses two types of session key calculating units to dynamically create the conditions based on an algebraic method utilizing higher order differential cryptanalysis at a certain round and then judges a session key prospect for this round to be false based on the conditions without actually calculating the session key. Thus, even in finding out session keys for two or more rounds, the total amount of calculation can be reduced though the brute-force search imposing a high load (7a, is employed at the immediately succeeding round, as long as the cipher has a transforming block like (7b) MISTY1 for example.

DETAILED DESCRIPTION OF THE PREFERRED EMBODIMENTS

Hereinafter, an embodiment of the present invention will be described.

Figure 1:
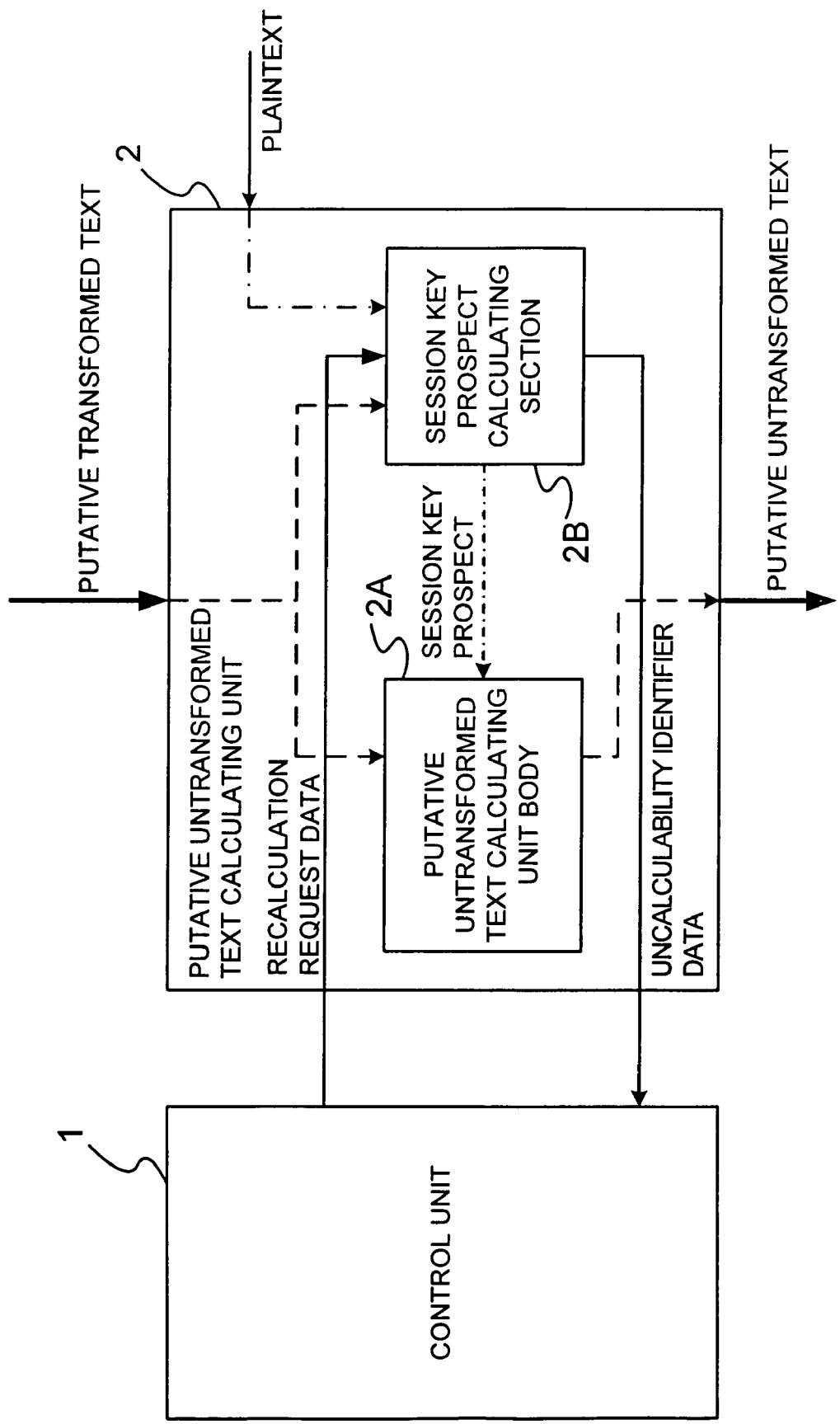
FIG. 1 is a block diagram illustrating functions related to the present invention.
Figure 2:
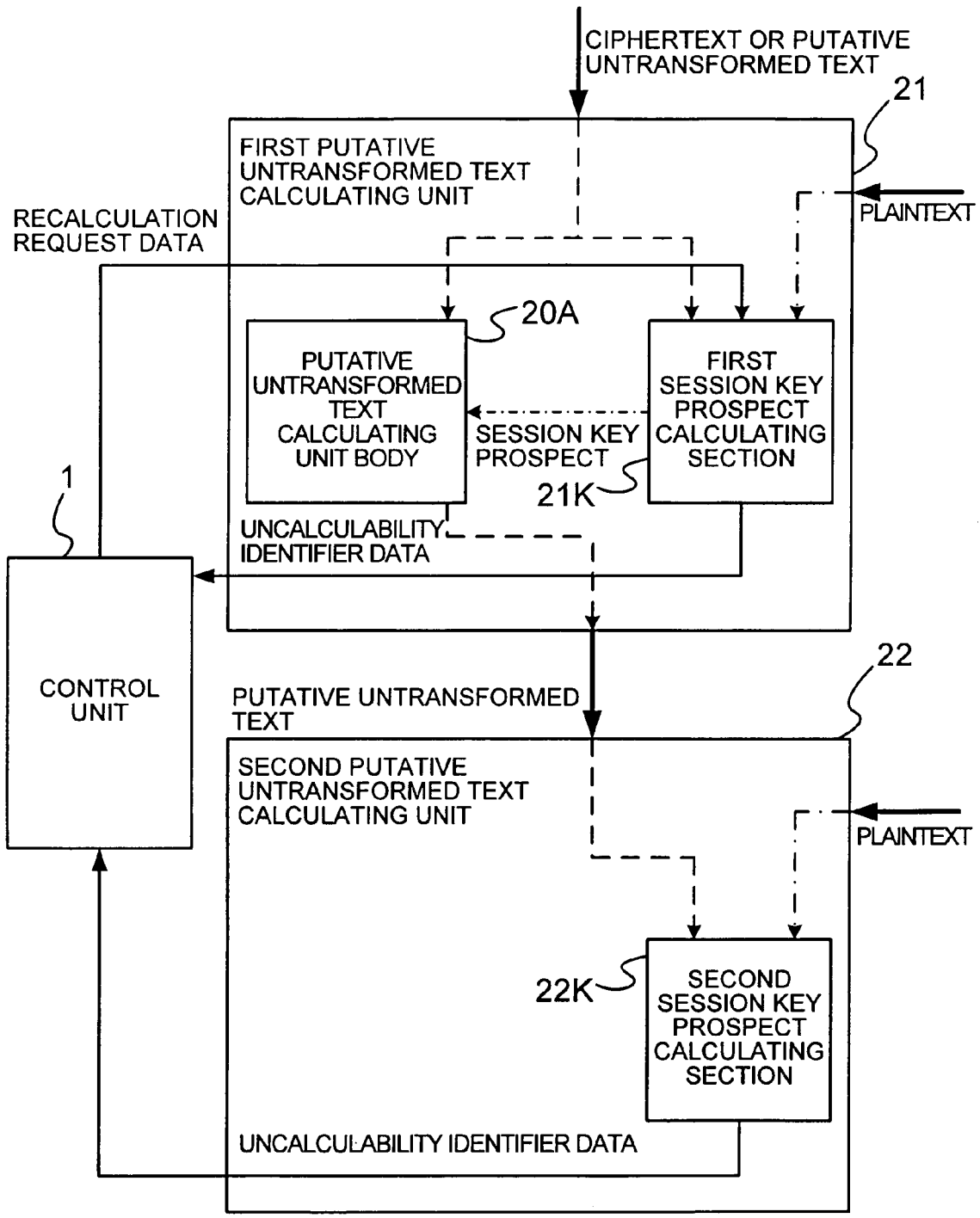
FIG. 2 is a block diagram illustrating functions related to the present invention.
Figure 3:
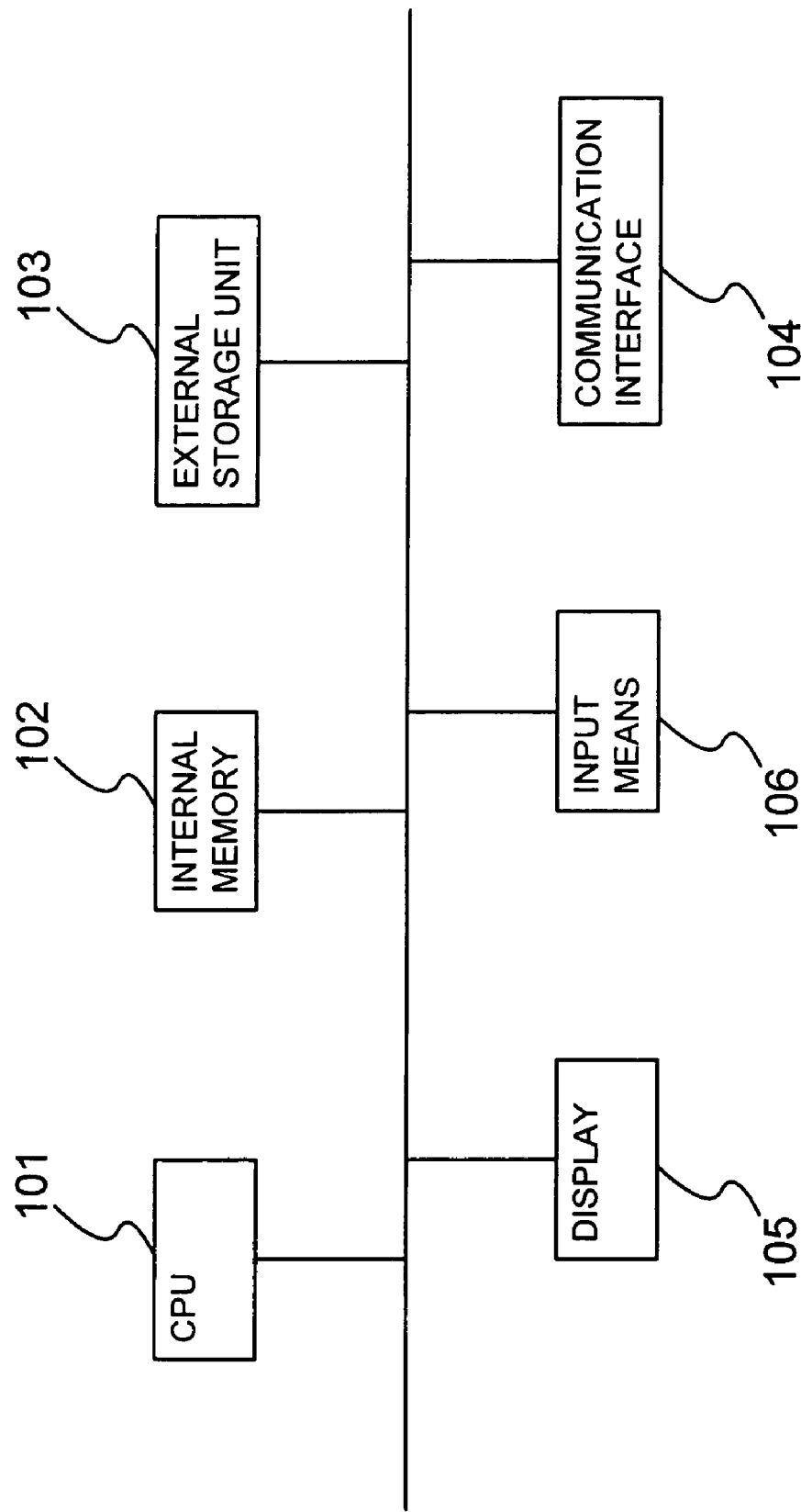
FIG. 3 is a block diagram illustrating the configuration of hardware in an embodiment of the present invention.

FIG. 2 is a block diagram illustrating the system configuration of a cipher strength estimating device according to this embodiment. The cipher strength estimating device is, for example, a general-purpose computer as shown and includes a CPU 101, internal memory 102, an external storage unit 103 such as HDD, a communication interface 104, such as a modem, for providing connection to a communication network, a display 105, input means 106 such as a mouse or a keyboard, and the like, as shown in FIG. 3. In one embodiment, as shown in FIG. 1, the control unit 1 interoperates with the putative untransformed text calculating unit 2. The putative untransformed calculating unit 2 comprises a putative untransformed text calculating unit body 2A and a session key prospect calculating section 2B. The putative untransformed calculating unit 2 can receive a putative transformed text and a plaintext and can output a putative untransformed text. The session key prospect calculating section 2B can receive the plaintext and the putative transformed text and can output a session key prospect to the putative untransformed text calculating unit body 2A. The session key prospect calculating section 2B can also receive recalculating request data from the control unit 1 and can also output uncalculability identifier data to the control unit 1. The putative untransformed text calculating text body can receive the putative transformed text and the session key prospect and can output the putative untransformed text.

Figure 4:
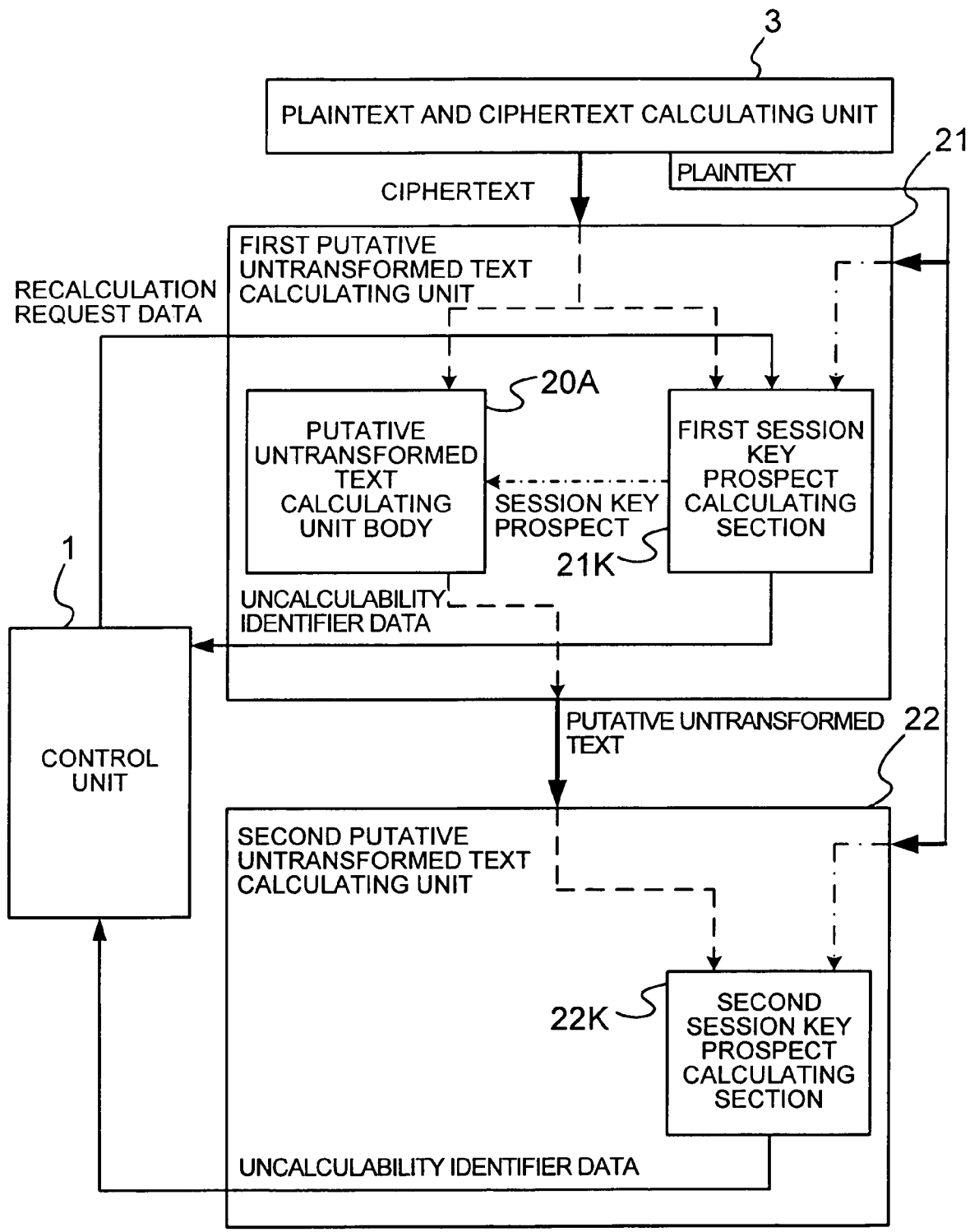
FIG. 4 is a block diagram illustrating functions of a cipher strength estimating device according to the same embodiment.

In another embodiment, by installing a predetermined program in the cipher strength estimating device and causing the CPU 101 and the peripheral devices to cooperate with each other, the cipher strength estimating device functions as a plaintext and ciphertext calculating unit 3, control unit 1, first putative untransformed text calculating unit 21, second putative untransformed text calculating unit 22, untransformed text calculating unit body 20A, first session key prospect calculating section 21K, and second session key prospect calculating section 22K, as shown in FIG. 4.

Figure 5:
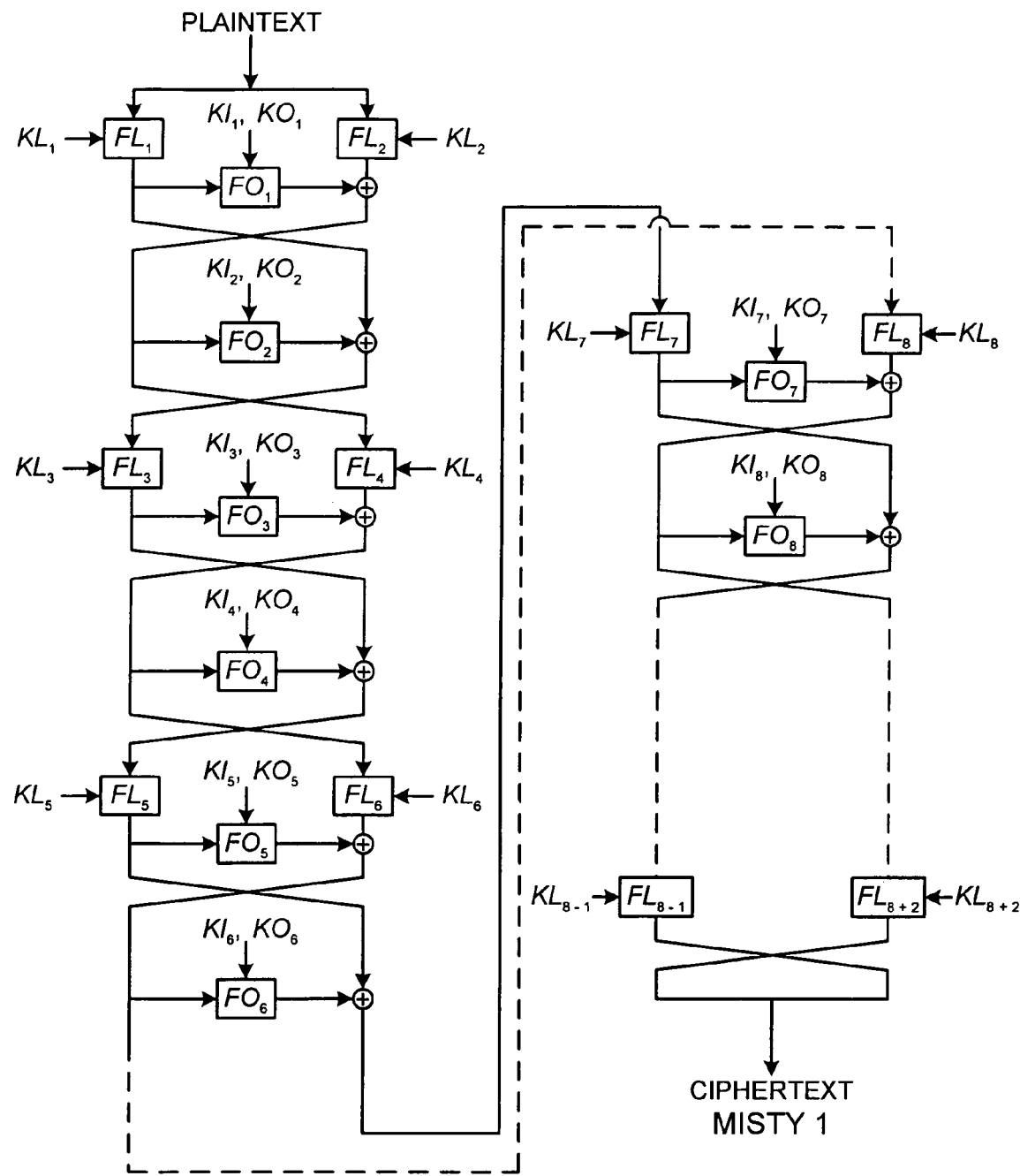
FIG. 5 is a diagram illustrating the function of MISTY1.
Figure 6:
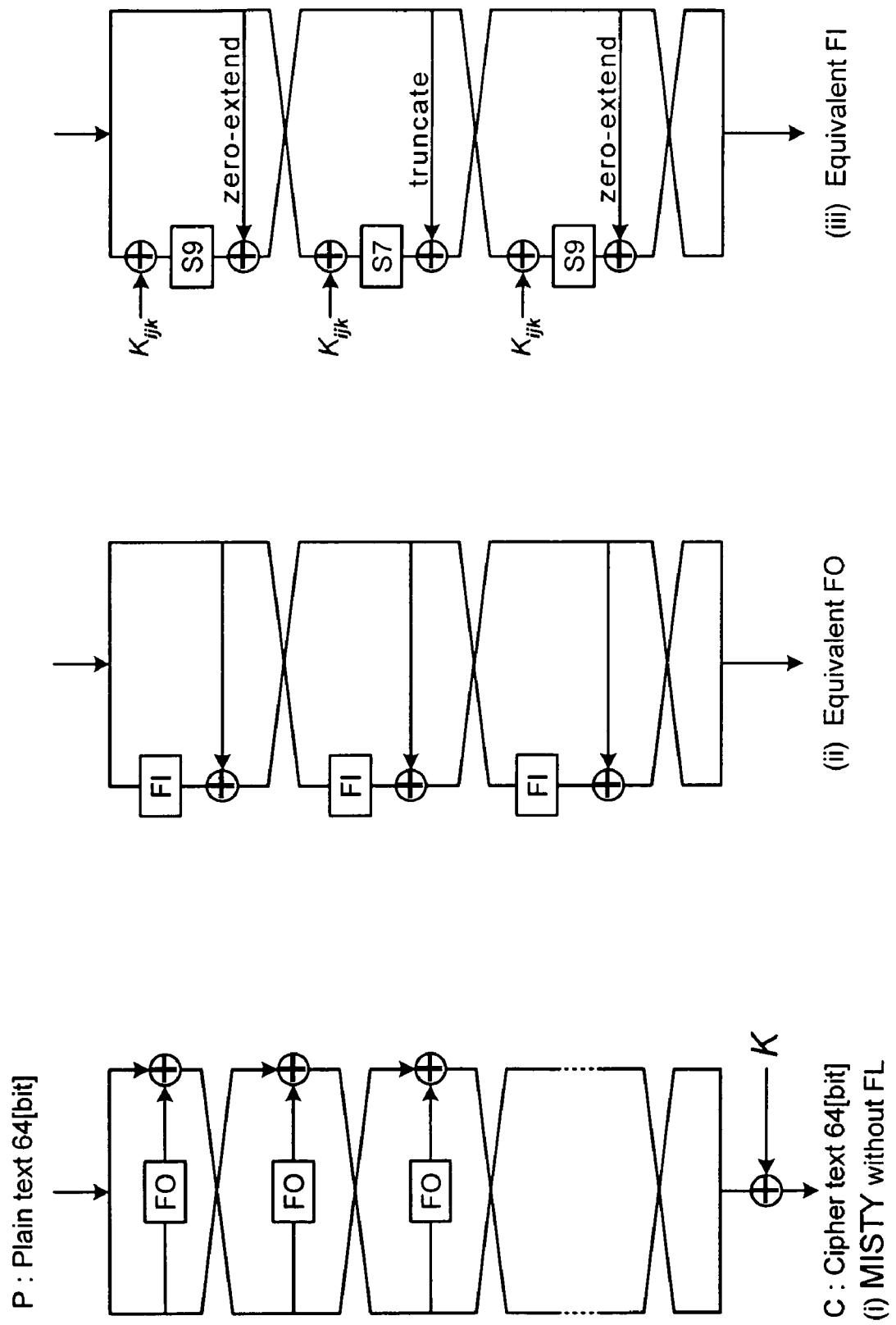
FIG. 6 is a diagram illustrating the function of modified MISTY1.

As shown in FIG. 5, MISTY1 is a block cipher which generates a 64-bit ciphertext from a 64-bit plaintext with use of a 128-bit user key and which comprises a transforming block called FO functions of 8-rounds, and linear FL functions. The transforming block includes FI functions as three intermediate transforming elements each including S-boxes as three transforming elements. This embodiment is configured to estimate the cipher strength of 6-round MISTY1 (hereinafter referred to as "modified MISTY1") shown in FIG. 6, the modified MISTY1 not including the FL functions shown in FIG. 5.

Detailed description will be made of each part of the cipher strength estimating device.

The order of a Boolean polynomial obtained by higher order cryptanalysis depends on the plaintext chosen. Since the order of such a polynomial influences the number of chosen plaintexts to be required and the amount of calculation to be required, it is important to choose effective plaintexts.

The plaintext is divided into 8 sub-blocks according to S-boxes S7 and S9, which are components of the transforming block provided in the modified MISTY1.

$$P = (X_7, X_6, \ldots, X_1, X_0), X_i \in \begin{cases} GF(2)^7, & i = \text{even} \\ GF(2)^9, & i = \text{odd} \end{cases}.$$

The degree of an output depends on which sub-block is selected as an input.

As a result of investigation on effective plaintexts, which make a slow increase in degree, a plaintext obtained by varying only the rightmost sub-block with the rest fixed was found effective. Accordingly, the plaintext and ciphertext calculating unit 3 is (9, configured to calculate a pair of plaintext and ciphertext satisfying such a condition.

Figure 7:
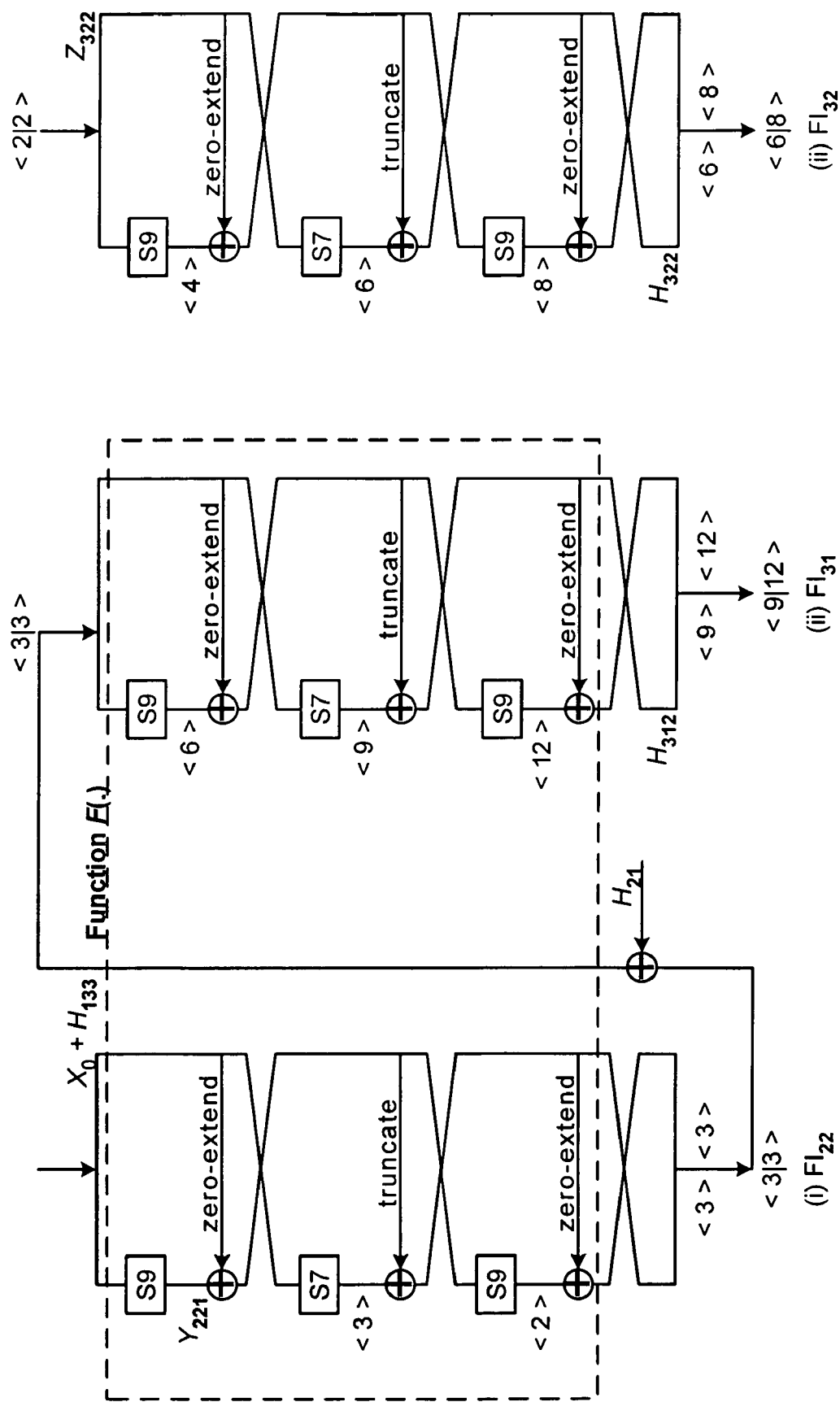
FIG. 7 is a diagram illustrating the function of a transforming block (FO function) of the modified MISTY1 containing the result of formal analysis on an increase in degree.

FIG. 7 illustrates an increase in degree by the formal analysis for such a plaintext. The symbol <i/j> denotes that the degree of the left block is i and the right block is j.

The first putative untransformed text calculating unit 21 is configured to receive a plaintext and a ciphertext outputted from the plaintext and ciphertext calculating unit and output a $5^{th}$ round putative untransformed text and is provided therein with the first session key prospect calculating section and the putative untransformed text calculating unit body.

The first session key prospect calculating section is configured to conduct the brute-force search and find one $6^{th}$ round session key prospect by calculation.

Further, the first putative untransformed text calculating unit 21 makes attempts to calculate another session key prospect for the relevant round which is different from the session key prospect already outputted in response to receipt of recalculation request data requesting recalculation and then outputs the aforesaid another session key prospect if the calculation thereof has been achieved or outputs uncalculability identifier data indicative of inability to calculate if the calculation of another session key prospect becomes impossible after completion of calculation of all session key prospects.

The putative untransformed text calculating unit body outputs a $6^{th}$ round untransformed text of MISTY1 by using the aforesaid one session key prospect. This is achieved by following the same procedure as in decryption.

The second putative untransformed text calculating unit 22 is configured to receive the plaintext and ciphertext outputted from the plaintext and cipher text calculating unit 3 and checks the output of a $5^{th}$ round session key prospect and is provided therein with the second session key prospect calculating section.

The second session key prospect calculating section first creates plural Boolean polynomials for dynamically calculating a session key prospect based on a putative transformed key inputted thereto.

Here, use is made of the following two properties that hold by the higher order differential cryptanalysis.

Property1:

$$deg_X\{F(X;K)\} = d \Rightarrow \begin{cases} \Delta^{(d+1)}F(X;K) = 0 \\ \Delta^{(d)}F(X;K) = \text{const} \end{cases} \quad (1)$$

Property2:

Let $F(X): GF(2)^n \mapsto GF(2)^n$.

If $V_{(a_0, a_1, \ldots, a_{n-1})} = GF(2)^n$, then for any fixed value $f \in GF(2)^n$, $\Delta^{(n)}F(X + f; K) = \Delta^{(n)}F(X; K)$.

The plaintext outputted from the plaintext and ciphertext calculating unit contains a 7-bit variable. For a cryptanalysis using (10a, $7^{th}$ order differential to be employed, first, a sub-space $V^{(7)}$ is determined (10b, as $$V^{(7)} = V_{[a0, a1, \ldots, a6]}, a_i = (0,0,\ldots,1,\ldots,0)) \in GF(2)^{64} \uparrow\text{i-th bit} \quad (2)$$

In the following, $\Delta^{(7)}{}_{[a0, a1, \ldots, a6]}$ is denoted as $\Delta^{(7)}$ when $V^{(7)}$ is understood.

Let $H^{L7}{}_{32}$ be the left 7 bits of the output from $FO_3$:

$$H_{32}{}^{L7} = H_{312} + H_{322} + Z_{322}. \quad (3)$$

From Property 1, the following holds.

$$\Delta^{(7)} H_{32}^{L7} = \Delta^{(7)}(H_{312} + H_{322} + Z_{322})]_7 \quad (4)$$
$$= \Delta^{(7)} H_{312}]_7,$$

where symbol "]d" denotes the operation of omitting terms whose degree is smaller than d.

Let F(.) be the function $GF(2)^7 \times GF(2)^9 \mapsto GF(2)^7$ shown in FIG. 7:

$$H_{312} = F(X_0 + H_{133} + K_{222}, Y_{221}). \quad (5)$$

Note that $Y_{221}$ is a constant for the chosen plaintext. As $X_0$ spans $GF(2)^7$, from Property 1, the following holds.

$$\Delta^{(7)} H_{312} = \Delta^{(7)} \mathcal{F}(X_0 + H_{133} + K_{222}, Y_{221}) \quad (6)$$
$$= \Delta^{(7)} \mathcal{F}(X_0, Y_{221})$$

From equations (22) and (24) [sic], there is obtained the $7^{th}$ order differential of $H^{L7}_{32}$:

$$\Delta^{(7)} H_{32}^{L7} = \Delta^{(7)} F(X_0, Y_{221})]_7. \quad (7)$$

As a result of calculation of the Boolean polynomial of $H_{312}$, it was found as follows: the degree of $H_{312}$ is 7, the $7^{th}$ order differential of $HL^7_{32}$ is 0×6D, and the coefficients of terms whose degree is 6, are functions of elements in $Y_{221}$.

$$X_{222} = (x_6, \ldots, x_0), (X_{222} = X_0 + H_{133} + K_{222}) \; Y_{221} = (y_8, \ldots, y_0), H_{312} = (\hbar_6, \ldots, \hbar_0)$$

The following condition is generated from $\Delta^{(7)} H_{32}^{L7} = 0 \times 6D$.

$$\sum_{A \in V^{(7)}} \{FO(C_L(P+A) + \mathcal{K}_L; K_{522}, K_{521}, K_{512}, K_{511}) + \quad (8)$$
$$C_R(P+A) + \mathcal{K}_R\} = 0 \times 6D$$
$$\mathcal{K} = (\mathcal{K}_L, \mathcal{K}_R), \mathcal{K}_L, \mathcal{K}_R \in GF(2)^{32}$$

Figure 8:
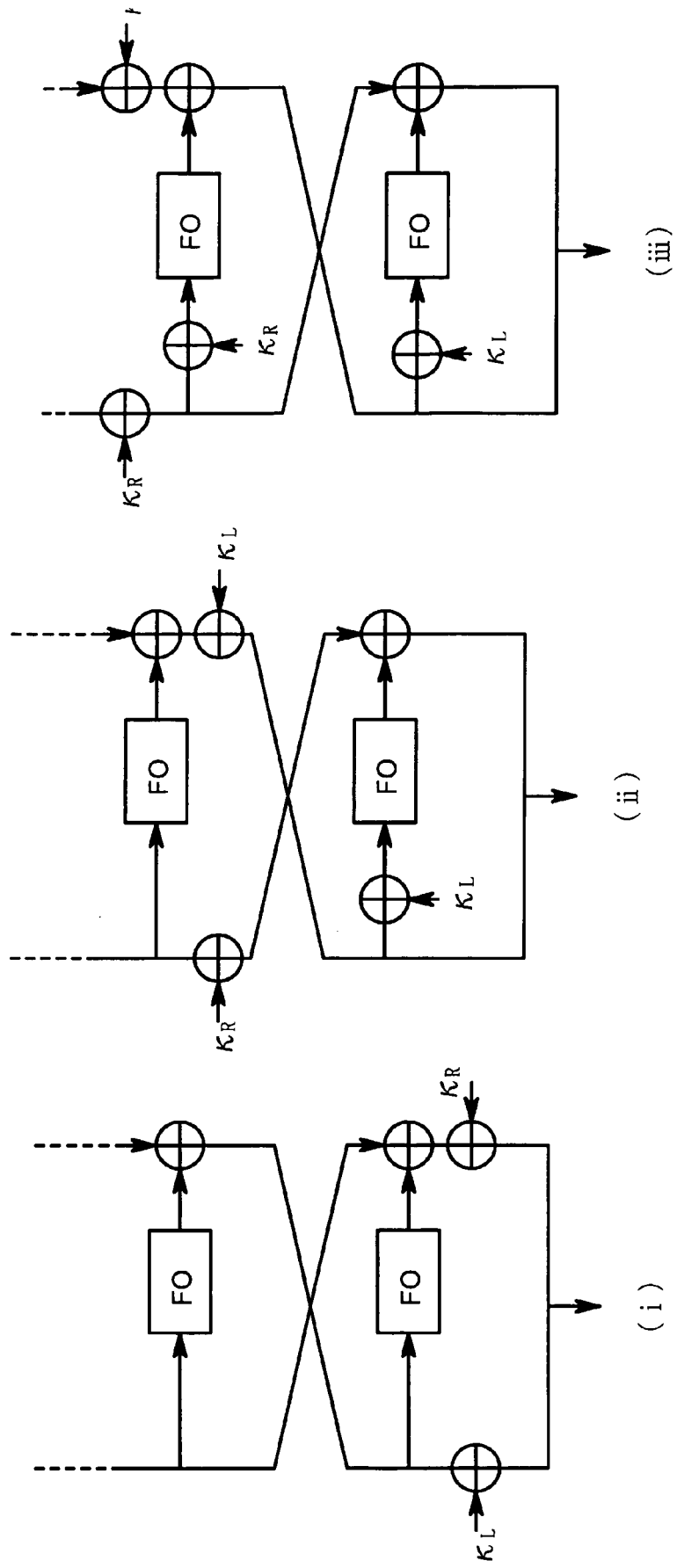
FIG. 8 is a diagram illustrating the process of transforming a key K in the modified MISTY1.

The key K can be moved as shown in FIG. 8. Since KL is divided into $K_{L1}$ and $K_{Lr} (\in GF(2)16)$ in FO5 function, the following holds in $FI_{51}$.

$$\mathcal{K}_{511} = K_{511} + K_{L1}^{L9} \quad \mathcal{K}_{512} = K_{512} + K_{L1}^{R7} \quad (9)$$

In $FI_{52}$, the following hold.

$$\mathcal{K}_{521} = K_{521} + K_{Lr}^{L9} \quad \mathcal{K}_{522} = K_{522} + K_{Lr}^{R7} \quad (9)$$

Thus, the condition (8) can be rewritten as follows.

$$\sum_{A \in V^{(7)}} \{FO(C_L(P+A); \mathcal{K}_{522}, \mathcal{K}_{521}, \mathcal{K}_{512}, \mathcal{K}_{511}) + C_R(P+A)\} = \quad (11)$$
$$0 \times 6D$$

The condition (11) thus obtained is turned into plural linear conditions by an algebraic method (see literature documents 7 and 9). The second session key prospect calculating section 22K uses these linear conditions in calculating a session key prospect.

If the plural conditions for calculating a session key prospect include conditions that are inconsistent with each other, the second session key prospect calculating section 22K outputs uncalculability identifier data indicative of inability to calculate the session key prospect.

Since this embodiment is configured for evaluation by finding session keys for the $6^{th}$ round and the $5^{th}$ round, respectively, the conditions created by the second session key prospect calculating section 22K for the calculation of a session key prospect are imparted with sufficient redundancy to make the resulting session key prospect true.

The control unit inputs the plaintext and the ciphertext obtained at the final round of the transformation process, which make a pair, to the first untransformed text calculating unit, receives a $6^{th}$ round putative untransformed text outputted and further inputs the putative untransformed text as a putative untransformed text for the $5^{th}$ round to the second untransformed text calculating unit together with the plaintext (11). Alternatively, in response to receipt of the uncalculability identifier data outputted from the second session key prospect calculating section, the control unit outputs the recalculation request data to the first session key prospect calculating section to cause the first session key prospect calculating section to calculate another $6^{th}$ round session key prospect and outputs a putative untransformed text for the $5^{th}$ round based on said another session key prospect.

The procedure for estimating a cipher outputted by the modified MISTY1 with use of the cipher strength estimating device thus configured is as follows.

In the plaintext and ciphertext calculating unit 3 there is established beforehand a condition for choosing a pair of plaintext and ciphertext which is suitable in applying the higher order differential cryptanalysis to the modified MISTY to be subjected to evaluation.

The plaintext and cipher text calculating unit 3 generates and outputs a pair of plaintext and ciphertext which satisfies the condition established.

The control unit 1 inputs the plaintext and ciphertext outputted from the plaintext and cipher text calculating unit 3 to the first untransformed text calculating unit 21.

The first untransformed text calculating unit 21 receives the plaintext and ciphertext inputted, and the first session key prospect calculating section 21K included in the first untransformed text calculating unit 21 calculates one of session key prospects which are prospects of the $_6$th round session key serving as an encryption parameter by utilizing the brute-force search method.

The untransformed text calculating unit body 20A included in the first untransformed text calculating unit 21 calculates a putative untransformed text presumed to be equivalent to a $6^{th}$ round output which is not transformed yet at the $6^{th}$ round, or the final round of transformation in the modified MISTY1 by decrypting the ciphertext using the session key prospect calculated by the first session key prospect calculating section 21K, and then outputs the putative untransformed text thus calculated as an output of the first untransformed text calculating unit 21.

Then, the control unit 1 receives the $6^{th}$ round putative untransformed text outputted and then inputs the putative untransformed text as a putative transformed text for the $5^{th}$ round to the second untransformed text calculating unit 22 together with the plaintext.

The second untransformed text calculating unit 22 receives the plaintext and the $5^{th}$ round putative transformed text, and the second session key prospect calculating section 22K included in the second untransformed text calculating unit 22 creates conditions (12a) for calculation of a $5^{th}$ round session key prospect dynamically by the use of the $5^{th}$ round putative transformed text and then performs calculation by an algebraic method (12b, or outputs the uncalculability identifier data if the conditions thus created include conditions that are inconsistent with each other (12c).

The control unit 1 outputs the recalculation request data to the first session key prospect calculating section 21K in response to receipt of the uncalculability identifier data outputted.

The first session key prospect calculating section 21K receives the recalculation request data outputted, calculates another $6^{th}$ round session key prospect, and outputs a $6^{th}$ round putative untransformed text based on the $6^{th}$ round session key prospect newly calculated.

In this way calculation of $6^{th}$ round session key prospect is repeated until the session key prospect for the $5^{th}$ round is obtained. Since the $5^{th}$ round session key prospect finally obtained can be considered to be equivalent to the aimed session key in terms of probability, the amount of calculation and the number of pairs of plaintext and ciphertext, which have been required to find the aimed session key, are displayed in the display as indicators for estimating the strength of the cipher.

It should be noted that the present invention is not limited to the foregoing embodiment.

The subject for evaluation is not limited to ciphers utilizing the modified MISTY1 or the transforming block of the MISTY1.

To find session keys for more rounds, the device of the present invention may further comprise additional transformed text calculating units or may use the existing transformed text calculating unit repeatedly.

It is, of course, possible to employ such a cryptanalysis as differential cryptanalysis or linear cryptanalysis instead of the brute-force search method or the higher order differential cryptanalysis in calculating session key prospects.

If the device is configured to allow an estimator to input, for example, a plaintext or a ciphertext to the plaintext and ciphertext calculating unit through input means such as a keyboard for the calculation of the plaintext and ciphertext, it is convenient for the estimator to find conditions to be satisfied by a pair of plaintext and ciphertext suited for estimation by trial and error. Alternatively, if the device is configured to receive a plaintext or a ciphertext as an input from a network or another program, parallel estimation of ciphers can be implemented by the use of a distributed processing control program which assigns and inputs plaintexts and ciphertexts to be newly estimated for example to individual cipher strength estimating devices.

If a putative untransformed text outputted from a certain putative untransformed text calculating unit of the cipher strength estimating device of the present invention is used as an input to a different cipher strength estimating device, or if a putative untransformed text outputted from a different cipher strength estimating device is used as an input to a certain putative untransformed text calculating unit of the cipher strength estimating device of the present invention, the present invention becomes applicable to the estimation of a cipher utilizing a complex of different transformation rounds for example (13).

As described above, the use of the cipher strength estimating device made it possible to prove that the modified MISTY1 can be decrypted by the use of $7^{th}$ order differential.

The cipher strength estimating device of the present invention uses brute-force search for the $6^{th}$ round sub-keys and the algebraic cryptanalysis for part of the $5^{th}$ round sub-keys, which requires $2^{12}$ chosen plaintexts and $2^{93}$ times the number of FO function operations. By virtue of the effect of reducing the amount of calculation, the cipher strength estimating device is estimated to be about $2^{30}$ times faster than the approach using brute-force search for a 128-bit user key. Therefore, the cipher strength estimating device has proved that at least 7-rounds is necessary for a cipher using MISTY1 as cryptography to resist higher order differential cryptanalysis.

The invention claimed is:

1. A cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising an untransformed text calculating unit and a control unit, the untransformed text calculating unit comprising a session key prospect calculating section and an untransformed text calculating unit body, wherein:

the untransformed text calculating unit is operative to receive, as inputs thereto, the plaintext and one of the ciphertext obtained at the final round of the transformation process and a putative transformed text presumed to be a transformed text obtained at a certain intermediate round;

the session key prospect calculating section is operative to: calculate one session key prospect presumed to be equivalent to the session key to be used at a relevant round of transformation by using the plaintext and one of the ciphertext and the putative transformed text or output uncalculability identifier data indicative of inability to calculate when the calculation is impossible; and optionally calculate another session key prospect for the relevant round which is different from the session key prospect already outputted in response to receipt of recalculation request data requesting recalculation;

the untransformed text calculating unit body is operative to: calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the untransformed text calculating unit; receive the putative untransformed text outputted; and repeatedly further input the putative untransformed text as a putative transformed text for a round immediately preceding the relevant round to the untransformed text calculating unit together with the plaintext; and optionally output the recalculation request data to the session key prospect calculating section in response to receipt of the uncalculability identifier data outputted from the session key prospect calculating section to cause the session key prospect calculating section to again calculate said another session key prospect for the immediately preceding round and then output the putative untransformed text based on said another session key prospect.

2. A cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising an untransformed text calculating unit and a control unit, the untransformed text calculating unit comprising a session key prospect calculating section and an untransformed text calculating unit body, wherein:

the untransformed text calculating unit is operative to receive, as inputs thereto, the plaintext and one of the ciphertext obtained at the final round of the transformation process and a putative transformed text presumed to be a transformed text obtained at a certain intermediate round;

the session key prospect calculating section is operative to: dynamically create a condition for use in calculating one session key prospect presumed to be equivalent to the session key to be used at a relevant round of transformation by using the plaintext and one of the ciphertext and the putative transformed text; calculate the session key prospect based on the condition thus created or output uncalculability identifier data indicative of inability to calculate when the calculation is impossible; and optionally calculate another session key prospect for the relevant round which is different from the session key prospect already outputted in response to receipt of recalculation request data requesting recalculation;

the untransformed text calculating unit body is operative to: calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the untransformed text calculating unit; receive the putative untransformed text outputted; repeatedly further input the putative untransformed text as a putative transformed text for a round immediately preceding the relevant round to the untransformed text calculating unit together with the plaintext; and optionally output the recalculation request data to the session key prospect calculating section in response to receipt of the uncalculability identifier data outputted from the session key prospect calculating section to cause the session key prospect calculating section to again calculate said another session key prospect for the immediately preceding round and then output the putative untransformed text based on said another session key prospect.

3. A cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising an untransformed text calculating unit and a control unit, the untransformed text calculating unit comprising a session key prospect calculating section and an untransformed text calculating unit body, wherein:

the untransformed text calculating unit is operative to receive, as inputs thereto, the plaintext and one of the ciphertext obtained at the final round of the transformation process and a putative transformed text presumed to be a transformed text obtained at a certain intermediate round;

the session key prospect calculating section is operative to: dynamically create conditions for use in calculating a session key prospect presumed to be equivalent to the session key to be used at a relevant round of transformation by using the plaintext and one of the ciphertext and the putative transformed text; calculate the session key prospect based on the conditions thus created or identify inability to calculate when inconsistency is found between certain two of the conditions and then output uncalculability identifier data indicative of inability to calculate; and optionally calculate another session key prospect for the relevant round which is different from the session key prospect already outputted in response to receipt of recalculation request data requesting recalculation;

the untransformed text calculating unit body is operative to calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the untransformed text calculating unit; receive the putative untransformed text outputted; repeatedly further input the putative untransformed text as a putative transformed text for a round immediately preceding the relevant round to the untransformed text calculating unit together with the plaintext; and optionally output the recalculation request data to the session key prospect calculating section in response to receipt of the uncalculability identifier data outputted from the session key prospect calculating section to cause the session key prospect calculating section to again calculate said another session key prospect for the immediately preceding round and then output the putative untransformed text based on said another session key prospect.

4. A cipher strength estimating device for estimating a strength of a ciphertext which is a transformed text obtained at a final round of a transformation process including: receiving a plaintext; transforming the plaintext using, as a parameter, a session key calculated from a key for use in encryption; and repeatedly further transforming the resulting transformed text which is the plaintext thus transformed to perform stepwise encryption, the cipher strength estimating device comprising a first untransformed text calculating unit, a second untransformed text calculating unit, and a control unit, the first untransformed text calculating unit comprising an untransformed text calculating unit body and a first session key prospect calculating section, the second untransformed text calculating unit comprising a second session key prospect calculating section, wherein:

the first untransformed text calculating unit is operative to receive, as inputs thereto, the plaintext and one of the ciphertext obtained at the final round of the transformation process and a putative transformed text presumed to be a transformed text obtained at a certain intermediate round;

the second untransformed text calculating unit is operative to receive, as inputs thereto, the plaintext and one of the ciphertext obtained at the final round of the transformation process and a putative transformed text presumed to be a transformed text obtained at a certain intermediate round;

the first session key prospect calculating section is operative to: conduct brute-force search for the session key to be used at a certain round of transformation by using the plaintext and one of the ciphertext and the putative transformed text; calculate one session key prospect presumed to be equivalent to the session key to be used at said certain round of transformation or output uncalculability identifier data indicative of inability to calculate when the calculation is impossible; and optionally calculate another session key prospect for said certain round which is different from the session key prospect already outputted in response to receipt of recalculation request data requesting recalculation;

the second session key prospect calculating section is operative to: dynamically create plural conditions for use in calculating a session key prospect presumed to be equivalent to the session key to be used at a relevant round of transformation by higher order differential cryptanalysis using the plaintext and one of the ciphertext and the putative transformed text; and calculate one session key prospect based on the conditions thus created or identify inability to calculate when inconsistency is found between certain two of the conditions and then output uncalculability identifier data indicative of inability to calculate;

the untransformed text calculating unit body is operative to calculate a putative untransformed text presumed to be equivalent to an untransformed text which is not transformed yet at the relevant round based on the session key prospect and one of the ciphertext and the putative transformed text; and output the putative untransformed text as an output of the untransformed text calculating unit; and the control unit is operative to: input the plaintext and one of the ciphertext obtained at the final round of the transformation process and the putative transformed text obtained at the certain intermediate round, which make a pair, to the first untransformed text calculating unit; receive the putative untransformed text outputted; input the putative untransformed text as a putative transformed text for a round immediately preceding the relevant round to the second untransformed text calculating unit together with the plaintext; and optionally output the recalculation request data to the first session key prospect calculating section in response to receipt of the uncalculability identifier data outputted from the second session key prospect calculating section to cause the first session key prospect calculating section to again calculate said another session key prospect for the immediately preceding round and then output the putative untransformed text based on said another session key prospect.

* * * * *